(12) United States Patent
Ohnishi et al.

(10) Patent No.: US 8,729,421 B2
(45) Date of Patent: May 20, 2014

(54) THERMAL CUTTING MACHINE AND THERMAL CUTTING METHOD

(75) Inventors: Satoshi Ohnishi, Komatsu (JP); Yoshihiro Yamaguchi, Komatsu (JP)

(73) Assignee: Komatsu Industries Corporation, Komatsu-Shi (JP)

( * ) Notice: Subject to any disclaimer, the term of this patent is extended or adjusted under 35 U.S.C. 154(b) by 872 days.

(21) Appl. No.: 11/629,283

(22) PCT Filed: Jun. 2, 2005

(86) PCT No.: PCT/JP2005/010111
§ 371 (c)(1),
(2), (4) Date: Dec. 13, 2006

(87) PCT Pub. No.: WO2005/123327
PCT Pub. Date: Dec. 29, 2005

(65) Prior Publication Data
US 2008/0029489 A1 Feb. 7, 2008

(30) Foreign Application Priority Data
Jun. 16, 2004 (JP) ................................. 2004-177819

(51) Int. Cl.
*B23K 9/02* (2006.01)
(52) U.S. Cl.
USPC ............ 219/121.39; 219/121.36; 219/121.56; 219/121.58
(58) Field of Classification Search
USPC ....................... 219/121.39, 121.58; 266/49, 65
See application file for complete search history.

(56) References Cited

U.S. PATENT DOCUMENTS

| | | | | |
|---|---|---|---|---|
| 4,067,556 | A | * | 1/1978 | Lagerwall et al. ............... 266/65 |
| 4,220,318 | A | * | 9/1980 | Anderson et al. ............... 266/49 |
| 5,128,512 | A | * | 7/1992 | Seki .......................... 219/121.82 |
| 5,160,079 | A | | 11/1992 | Cole |

(Continued)

FOREIGN PATENT DOCUMENTS

| | | |
|---|---|---|
| JP | 2-144266 U | 12/1990 |
| JP | 5-77080 A | 3/1993 |

(Continued)

OTHER PUBLICATIONS

Machine Translation of JP 07-236976.*
International Search Report of PCT/JP2005/010111 date of mailing Sep. 13, 2005.
Japanese Office Action dated Aug. 31, 2010, issued in corresponding Japanese Patent Application No. 2004-177819.

*Primary Examiner* — Brian Jennison
(74) *Attorney, Agent, or Firm* — Westerman, Hattori, Daniels & Adrian, LLP

(57) ABSTRACT

A lattice pallet 13 having a large number of supporters for placing a plate 14 is installed to a table 12 so as to be freely fittable and removable. Bringing in of the plate 14 is performed by the method of raising the lattice pallet 13 with a crane with the plate 14 already having been loaded upon the lattice pallet 13 in a different location, transporting them over the table 12, and lowering them down onto the table 12. Directly after cutting has been completed, the lattice pallet 12 is raised and separated from the table 12 with the manufactured product and the left over material carried upon it and is taken away to a different location, and another lattice pallet 13 with another plate 14 mounted upon it is brought in with the crane upon the table 12, and the task of cutting this other plate 14 is commenced.

6 Claims, 8 Drawing Sheets

(56) References Cited

U.S. PATENT DOCUMENTS

| | | | | |
|---|---|---|---|---|
| 5,359,175 | A * | 10/1994 | Miyagawa et al. | 219/121.82 |
| 6,300,592 | B1 * | 10/2001 | Ulrich et al. | 219/121.67 |
| 6,320,153 | B1 * | 11/2001 | Hulings et al. | 219/121.39 |
| 6,761,776 | B2 * | 7/2004 | Bowlin et al. | 148/196 |
| 2003/0080096 | A1 * | 5/2003 | Yamaguchi et al. | 219/121.39 |
| 2003/0127440 | A1 * | 7/2003 | Egashira | 219/121.82 |
| 2005/0116396 | A1 * | 6/2005 | LeMasson | 266/65 |

FOREIGN PATENT DOCUMENTS

| | | |
|---|---|---|
| JP | 5-237695 A | 9/1993 |
| JP | 6-19991 U | 3/1994 |
| JP | 6-198484 A | 7/1994 |
| JP | 7-236976 A | 9/1995 |
| JP | 2003-136248 A | 5/2003 |

* cited by examiner

THERMAL CUTTING MACHINE AND THERMAL CUTTING METHOD

FIELD

The present invention relates in general to a thermal cutting machine such as a plasma cutting machine, a laser cutting machine, a gas cutting machine or the like which performs thermal cutting of a plate placed upon a table, and more particularly relates to an improvement in the construction of a table for simply fetching the plate and removing the finished product. Moreover, the present invention relates to a method of cutting a plate using a thermal cutting machine.

BACKGROUND

A table for this type of thermal cutting machine is disclosed in Patent Document #1, etc. A large number of supporters (long and narrow plates) for mounting the plate upon are arrayed in an upper portion of a table for this type of thermal cutting machine, arranged at constant intervals. Normally, the order of processing for a plate is as follows: (1) the operator raises the plate and brings it in upon the table and places it upon the supporters with a crane, with the thermal cutting machine being stopped at this time; (2) the thermal cutting machine is started, and cutting of the plate is performed; (3) after cutting has been completed, a workman gets onto the table, and sorts out the manufactured product from the material which is left over, with the thermal cutting machine being stopped at this time; (4) the workman takes the left over material away from the table by raising it with the crane.

Furthermore, the supporters upon the table need to be exchanged from time to time, since the degree to which they are damaged increases progressively along with the number of times the cutting process is performed.

Patent Document #1: Japanese Laid-Open Patent Publication 2003-136248.

SUMMARY

As described above, during the operations of bringing in the plate, sorting out the products, and taking away the left over material upon the table, the thermal cutting machine is stopped. The following types of technique are proposed in order to shorten this stop time. In one such technique, a device is put into place in a position adjacent to the table for fetching and taking away the plate automatically. In another, a large table upon which a plurality of plates are placed in line is set up, and it is arranged to perform the work of fetching and taking away one plate and the cutting of another plate at the same time in parallel upon this table.

However, an automatic fetching and taking away device requires a complicated mechanism which is of high cost, and it is also necessary to ensure space for setting it up in the neighborhood of the table. Furthermore, the application of such an automatic fetching and taking away device in practice is difficult, since a plate whose thickness is medium or greater is of great weight. On the other hand, with a large table, a wide space is required for the setup, and its cost is high. Moreover, it is dangerous for work by a workman and cutting by the machine to be performed at the same time in parallel upon the same table.

Furthermore, even if one or the other of these schemes is adopted, it is necessary to stop the machine while the supporters upon the table are exchanged.

Accordingly, the object of the present invention is to make it possible, with a simple structure, to shorten the stop time of the thermal cutting machine, involved in loading and unloading the plate and/or exchanging the supporters.

According to the present invention, a thermal cutting machine which cuts a plate placed upon a table using heat includes a lattice pallet, which is installed upon said table, and which includes a plurality of supporters in an array for placing the plate thereupon and a support frame which supports these supporters. The support frame of said lattice pallet is installed upon said table so as to be freely removable therefrom, and the lattice pallet can be raised with a crane from the table and separated from the table with the plate still placed just as it is upon the supporters, and moreover can be installed upon the table by being lowered thereupon with the crane. Due to this, it is possible to install a lattice pallet upon which a plate has been loaded in advance in a different location upon the table, by bringing it in above the table with the crane and lowering it down. And, after a task of cutting this plate has been completed, the lattice pallet is raised with the crane and separated from the table, with the manufactured product and the left over material still loaded upon the pallet just as they are, and is transferred to a different location, and then the tasks of sorting out the manufacture product and the left over material, and of removing the left over material and the like, are performed in that different location. It is possible to arrange to install a plurality of lattice pallets upon the table one after another. When this is done, while performing a task of placing a plate upon some one lattice pallet in the location which is different from the table, or a task of removing the manufactured product or the left over material from upon this one lattice pallet, in parallel therewith, it is possible to bring in with the crane a different lattice pallet, with a different plate loaded thereupon, to install them upon the table, and to perform cutting of this different plate. Due to this, the stop time of the machine is shortened. Moreover, no exceptional device of large size or high cost is required.

In a preferred embodiment, the supporters of the lattice pallet are freely fittable and removable to and from the support frame, and are adapted so that, after the lattice pallet has been transferred to a different location from the table, the supporters upon the support frame can be exchanged. Accordingly, while the supporters are being changed over in the different location, it is possible for another lattice pallet with another plate loaded upon it to be brought in by the crane and installed upon the table, and for cutting of this other plate to be performed. Due to this, the stop time of the machine is shortened.

In a preferred embodiment, an exhaust chamber is provided in an interior of the table; and an aperture connected to the exhaust chamber is provided in the upper portion of the table, and is adapted for the lattice pallet to be installed therein. And guides are provided to one or both of the table and the lattice pallet, for positionally aligning the lattice pallet in the aperture. And, when the lattice pallet is lowered down upon the table, the lattice pallet is guided into the aperture by the guides. Due to this, a task of installing the lattice pallet upon the table becomes simple, and it becomes easy to shorten the stop time of the machine by yet a further level.

In a preferred embodiment, the lattice pallet is of a planar size which is suitable for placing one standard dimension plate of a predetermined type, and includes a margin portion which, when one standard dimension plate of the predetermined type is placed in the middle thereof, projects to an outside of that standard dimension plate. Moreover, on this margin portion, there are provided a plurality of engagement lugs which can engage with hooks of raising wires. When engaging the hooks of the raising wires to these engagement lugs and performing raising with the crane, there is no problem of damaging the plate upon the pallet or the like, since the wires and the hooks do not come into contact with the plate.

In a preferred embodiment, the engagement lugs are arranged so that, in the state in which the lattice pallet is installed upon the table, their upper ends are positioned below the upper edges of the supporters of the lattice pallet. Due to this, there is no problem of the engagement lugs constituting obstacles to the cutting of the plate, or of the engagement portions suffering damage like the supporters as the plate is cut. Furthermore, the engagement lugs do not constitute protruding obstacles when the plate is being brought in or removed, even if the plate is shifted in a horizontal direction.

In a preferred embodiment, said lattice pallet comprises position determination assistance members for aiding with position determination of the plate placed upon said lattice pallet.

According to the present invention it is possible, with a simple structure, to shorten the stop time of the thermal cutting machine, involved in fetching the plate and taking it away and/or exchanging the supporters.

SYMBOLS IN DRAWINGS

Figure 1:
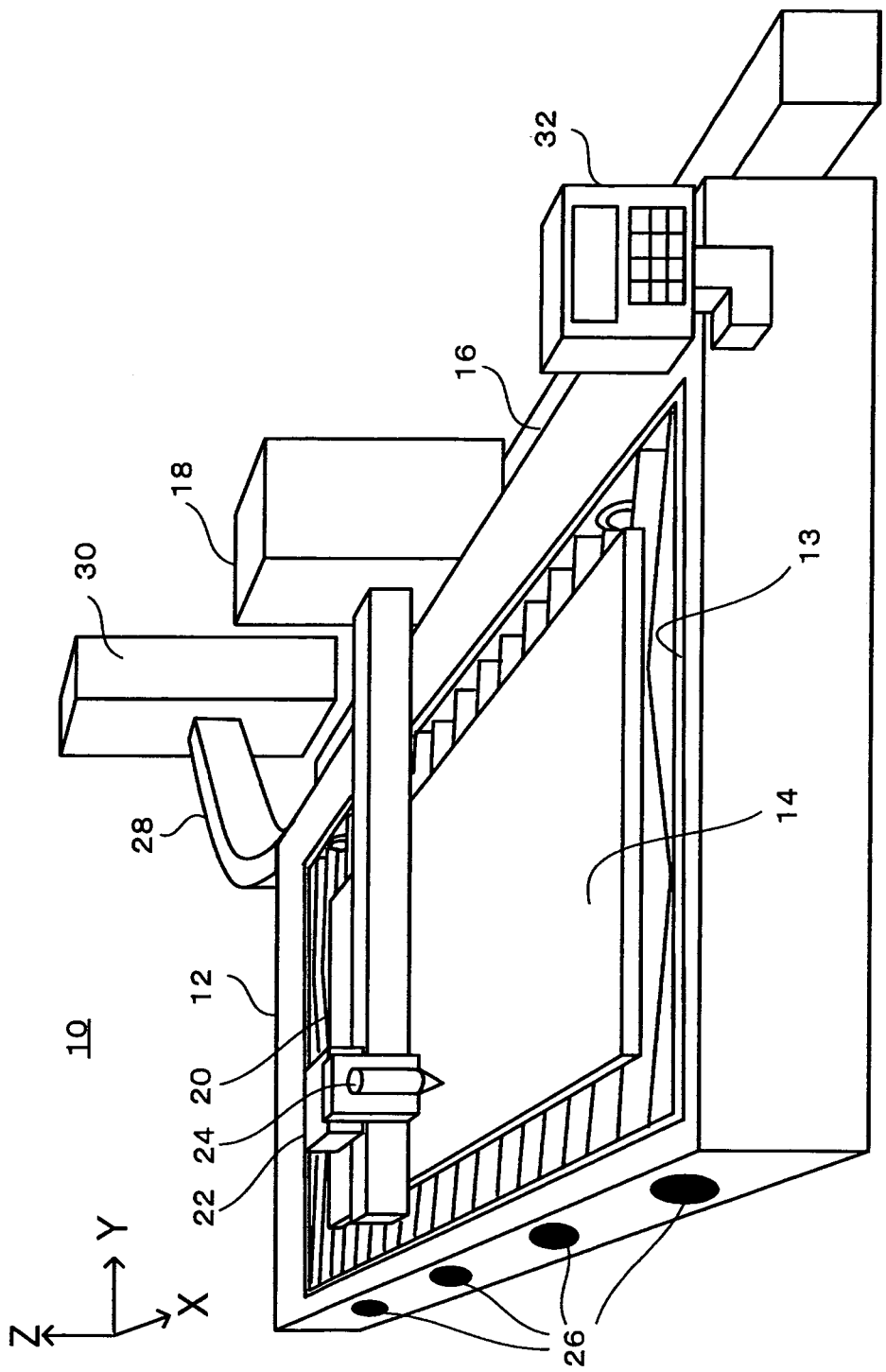
FIG. 1 is a perspective view showing the overall structure of a thermal cutting machine according to the present invention.

10: thermal cutting machine
12: table
13: lattice pallet
13A: main portion of lattice pallet
13B: margin portion of lattice pallet
14: plate
16: X axis track
18: shift trolley
20: Y axis track
22: carriage
24: cutting head
26: intake fan
28: connection duct
30: dust collector
32: controller
40: support frame
52: supporter
54A-54D: engagement lug
60: guide plate
61: position determination assistance member
62: guide hole
63: position determination pin
70: support block
74: guide pin
90: inclined portion (guide)
92: inclined portion (guide)

EMBODIMENTS

FIG. 1 is a perspective view showing the overall structure of a thermal cutting machine according to the present invention.

As shown in FIG. 1, this thermal cutting machine 10 comprises a box shaped table 12 which is set up upon a floor. A lattice pallet 13 which has a rectangular plane shape is installed upon the upper surface of this table 12, and a plate 14, which is the material to be cut, is mounted upon this lattice pallet 13. The lattice pallet 13 is set into an aperture upon the upper portion of the table 12 (reference numeral 79 in FIG. 6), and can be freely fitted to and removed from the table 12. With the plate 14 still mounted upon the lattice pallet 13, it is possible to separate the lattice pallet 13 from the table 12 by raising it from the table 12 with a crane, or to install it upon the table 12 by lowering it onto the table 12 with a crane.

Incidentally, as the plate 14, a plate is generally used whose planar size agrees with a specified standard size. In this specification, a plate 14 which is of such a standard planar size is termed a "standard dimension plate". As the planar size of such a standard dimension plate (its standard size), there are a plurality of types, such as, for example, 1.5 m×3 m and 2.4 m×6 m. The lattice pallet 13 is designed with the expectation that one standard dimension plate of one predetermined type will be placed upon it. Accordingly, the planar size of the lattice pallet 13 is adapted to the planar size of this one standard dimension plate of one predetermined type.

Referring again to FIG. 1, an orthogonal X-Y-Z coordinate system is defined for numerical calculation processing in order to control the cutting position on the plate 14. The X axis of this orthogonal X-Y-Z coordinate system is parallel to the long side of the lattice pallet 13; the Y axis is parallel to the short side of the lattice pallet 13; and the Z axis is perpendicular to the upper surface of the lattice pallet 13 (i.e. to the upper surface of the plate 14).

An X axis track 16 is set up on the floor at the flank of the table 12, parallel to the X axis. A shift trolley 18 is mounted upon this X axis track 16, and can shift along the X axis direction along the X axis track 16. A Y axis track 20 is fixed to this shift trolley 18, and extends linearly over the lattice pallet 13 in the Y axis direction. When the shift trolley 18 shifts in the X axis direction, the Y axis track 20 also shifts along the X axis direction together therewith. Although, in the example shown in the figure, the Y axis track 20 is a cantilevered arm which is supported by the shift trolley 18 only at its one end, this is only shown by way of example; it could also be an arm which is supported at both of its ends.

A carriage 22 is mounted upon the Y axis track 20, and can be shifted along the Y axis track 20 in the Y axis direction. A cutting head 24 is mounted upon this carriage 22. The carriage 22 can shift the cutting head 24 along the direction of the Z axis. For example, in the case of a plasma cutting machine this cutting head 24 is a plasma torch, in the case of a laser cutting machine it is a laser torch, and in the case of a gas cutting machine it is a gas burner; and, in the case of a compound or hybrid type cutting machine, it is a set of torches or burners of the various different types described above. The cutting head 24 is drive controlled by a controller 32. A head shifting device for shifting the cutting head 24 in the X, Y, and Z axis directions is constituted by the above described X axis track 16, shift trolley 18, Y axis track 20, and carriage 22. This head shifting device is able to move the cutting head 24 to any position over the entire area of the lattice pallet 13. And this head shifting device is drive controlled by the controller 32. The controller 32 is adapted to drive control the cutting machine 10 according to operation commands from a human being, and according to a processing program.

A plurality of intake fans 26 are installed to the side of the table 12 along the Y axis direction, for blowing air into the interior space within the table 12. The interior space within the table 12 is connected to a dust collector 30 via a connection duct 28. This dust collector 30 sucks in the air in the interior of the table 12 during cutting of the plate 14, and eliminates fumes or the like contained therein. The intake fans 26 help with exhausting the air from within the table 12 to the dust collector 30.

Figure 2:
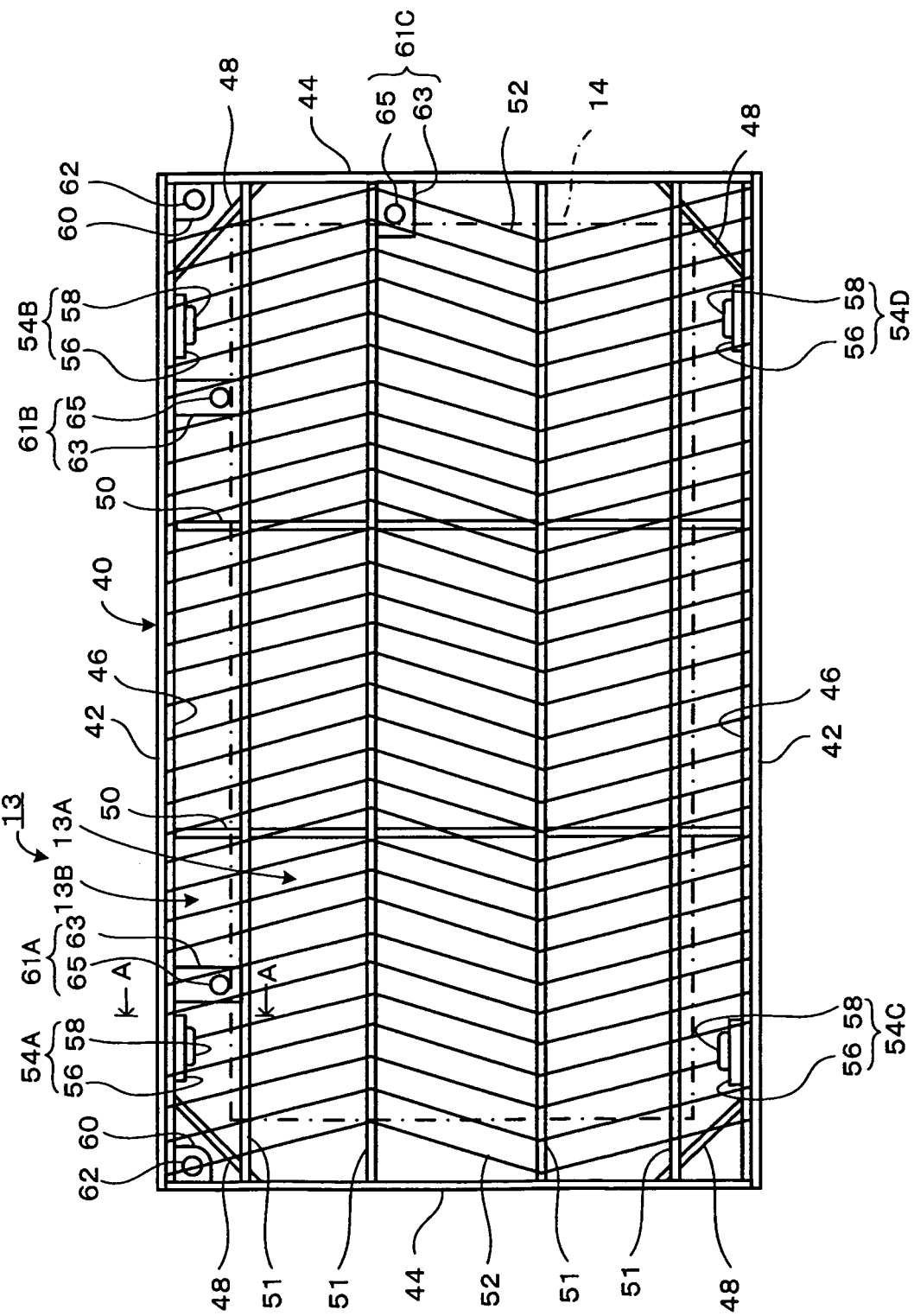
FIG. 2 is a plan view of a lattice pallet 13.
Figure 3:
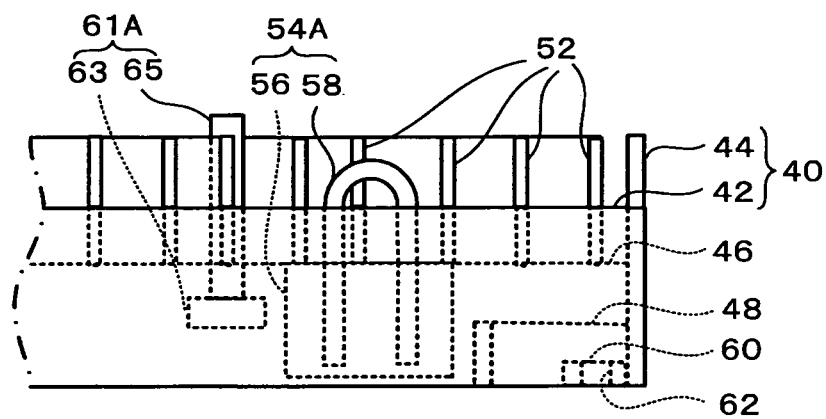
FIG. 3 is an elevation view of the neighborhood of the upper left corner of the lattice pallet 13 of FIG. 2, as seen from the exterior.
Figure 4:
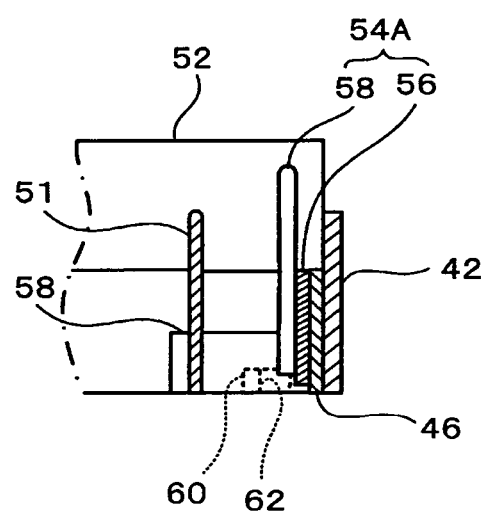
FIG. 4 is a sectional view of this neighborhood of the upper left corner of the lattice pallet 13 of FIG. 2, as seen in a sectional plane A-A.
Figure 5:
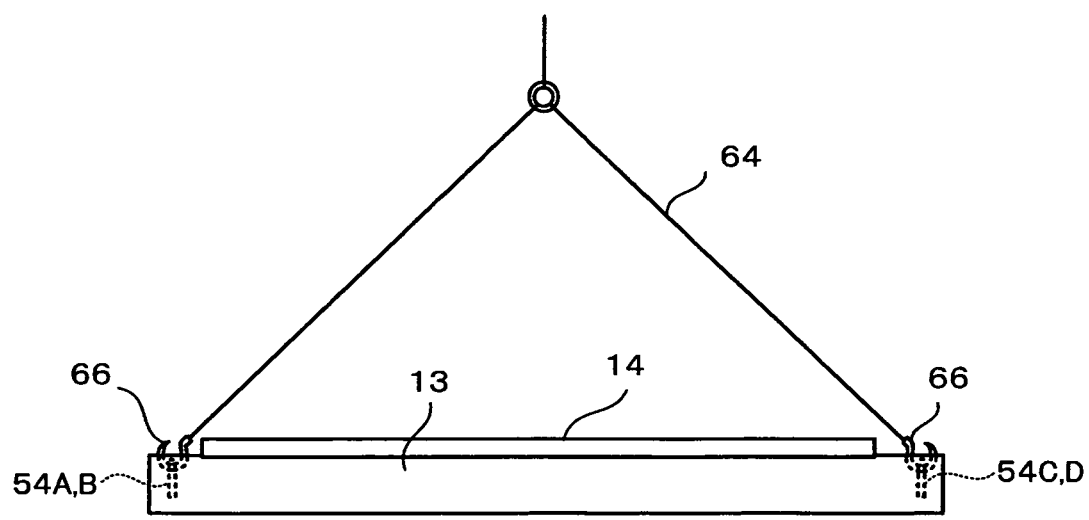
FIG. 5 is a side view showing a situation in which the lattice pallet 13 has been raised.

FIG. 2 is a plan view of the lattice pallet 13. FIG. 3 is an elevation view of the neighborhood of the upper left corner of the lattice pallet 13 of FIG. 2, as seen from the exterior. FIG. 4 is a sectional view of this neighborhood of the upper left corner of the lattice pallet 13 of FIG. 2, as seen in a sectional plane A-A. And FIG. 5 is a side view showing the lattice pallet 13 when it has been raised with a crane.

As shown in FIG. 2, the lattice pallet 13 comprises a support frame 40 having an external frame which is rectangular as seen in plan view, and which is made by welding together two long girders 42, 42 and two short girders 44, 44 by their end portions. In this support frame 40 inner girders 46, 46, whose heights are lower than that of the long girders 42, are welded on the inside of those long girders 42, 42, so that their bottom edges agree with those of the long girders 42, 42. A plurality of short linking beams 50, 50 (for example, two thereof bridge between these inner girders 46, 46, and, at both their ends, these beams 50 are welded to the lowest point on the inner side surfaces of the inner girders 46, 46. Furthermore, a plurality of long linking beams 51, 51, 51, 51 (for example, four thereof bridge between the short girders 44, 44, riding over the short linking beams 50, 50, and these beams 51 are welded at both their ends to the inner surfaces of the short girders 44, 44. These long linking beams 51, 51, 51, 51 are welded to the short linking beams 50, 50 at the places where they cross them. Moreover, in the neighborhood of the corner portions at the four corners of the support frame 40, diagonals 48, 48, 48, 48 are welded to the lowest points on the inner sides of the inner girders 46, 46 and of the short girders 44, 44.

A large number of supporters 52 are arrayed at fixed intervals upon the support frame 40 described above. As will be understood from FIGS. 3 and 4, these supporters 52 are supported in the state of being carried upon the long linking beams 51, 51, 51, 51 and upon the inner girders 46, 46 of the support frame 40. Grooves are formed in the long linking beams 51, 51, 51, 51 at the positions where they intersect the supporters 52, and the supporters 52 are set into these grooves. Due to this, the position and the erect attitude of each of the supporters 52 is fixed upon the support frame 40. These supporters 52 can be freely fitted to the support frame 40 and removed therefrom, and can be taken away from the support frame 40 by lifting them upwards. The plate 14 is placed upon these supporters 52. As shown in FIG. 2, each of the supporters 52 is made in a plane shape folded into a zigzag, and this arrangement, along with endowing the supporters 52 with strength for resisting the added weight of the plate 14, also maintains them stably in an erect attitude upon the support frame 40.

As for the planar size of the lattice pallet 13, this is the planar size of one of the plates 14 of standard dimensions of the one predetermined type which it is intended to mount thereupon (i.e. is the standard size of one type), increased by just a slight marginal distance along both, or along only one of, its long side and its short side. Accordingly, as shown in FIG. 2, when one standard dimension plate 14 of this type is laid upon the middle of the lattice pallet 13, a portion 13B which corresponds to the above described margin distance of the lattice pallet 13 extends outward from the standard dimension plate 14. As will be explained hereinafter, this portion 13B of the lattice pallet 13 which extends outward from the standard dimension plate 14 as described above will be termed its "margin portion", while its portion 13A which is underneath the standard dimension plate 14 will be termed its "main portion".

As shown in FIG. 5, four engagement lugs 54A, 54B, 54C, and 54D are provided in the margin portion 13B of the lattice pallet 13, into which suspension hooks 66 are engaged when the lattice pallet 13 is to be raised by a crane (not shown in the figures). These engagement lugs 54A, 54B, 54C, and 54D are, for example, fixed at four spots close to the corner portions of the inner girders 46, 46 by welding or by bolts and nuts. Each of these engagement lugs 54A, 54B, 54C, and 54D may consist, for example, of a base 56 which is fitted to the inner girders 46, 46 by welding or by bolts and nuts, and a reception hook 58, welded at its lower portion to the base 56, for engaging with one of the suspension hooks 66 described above.

As described above, the engagement lugs 54A, 54B, 54C, and 54D are disposed in the margin portion 13B of the lattice pallet 13, not in its main portion 13A. Furthermore, as shown in FIG. 5, in consideration of the size of the suspension hooks 66 which are normally used and in consideration of the thickness of the plate 14 and the like, a sufficient clearance distance is ensured from the engagement lugs 54A, 54B, 54C, and 54D to the edge of the plate 14, so that the suspension hooks 66 and a suspension wire 64 do not come into contact with the plate 14. Due to this, as shown in FIG. 5, it is possible to engage the suspension hooks 66 into the engagement lugs 54A, 54B, 54C, and 54D, and to raise the lattice pallet 13, with the plate 14 still carried upon the lattice pallet 13 just as it is. As a result, the tasks of bringing in the plate 14 to the table 12, and of taking it away and the like, can be performed in a short time period by transferring the lattice pallet 13 with a crane, with the plate 14 carried upon it.

Moreover, as will be understood from FIGS. 3 and 4, the upper ends of the engagement lugs 54A, 54B, 54C, and 54D (i.e. the upper ends of the reception hooks 58) are positioned at positions lower than the upper edges of the supporters 52. Due to this, during the work of cutting the plate 14, the thermal jet (for example a plasma arc or a laser beam or the like) from the cutting head 24 (see FIG. 1) does not impinge upon the engagement lugs 54A, 54B, 54C, and 54D and do damage to them, and furthermore there is also no danger that the engagement lugs 54A, 54B, 54C, and 54D will constitute an impediment to the cutting process. It should be understood that although, in this embodiment, the reception hooks 58 of the engagement lugs 54A, 54B, 54C, and 54D are fixed at positions which are lower than the supporters 52, alternatively, in a variant embodiment, it would also be acceptable to fit the reception hooks 58 so that they are movable in the vertical direction, and accordingly, during raising, the reception hooks 58 are pulled up to positions which are higher than the supporters 52, while, at other times, the reception hooks 58 are lowered to positions which are lower than the supporters 52. Furthermore, as another variant embodiment, without specifically providing the engagement lugs as dedicated components, it would also be possible to arrange to make other portions of the lattice pallet 13, for example portions of its support frame 40 (for example, the diagonals 48, the girders 42 or 44 or 46, or the like) so that they are able also to serve as engagement lugs.

As shown in FIG. 2, two guide plates 60, 60 are further provided in the margin portion 13B of the lattice pallet 13, and respective guide holes 62, 62 are provided pierced through these guide plates 60, 60. These guide plates 60, 60, for example, may be provided at two of the corner portions of the lattice pallet 13, and may be welded at the lowest spots on the inner sides of the inner girders 46, 46 and the short girders 44, 44. When the lattice pallet 13 is lowered down upon the table 12 with a crane and is assembled to the table 12, the respective guide holes 62 of these guide plates 60, 60 engage over guide pins (reference numeral 74 in FIG. 6) which are provided to the table 12, and thereby serve the function of positionally aligning the lattice pallet 13 upon the table 12. Since these guide plates 60, 60 are provided in the margin portion 13B, when assembling the lattice pallet 13 to the table 12, the guide plates 60, 60 are not hidden by the plate 14 and can always be seen from the point of view of the workman, and accordingly it is easy for the positional alignment to be performed.

Furthermore, as shown in FIG. 2, position determination assistance members 61A, 61B, 61C, are fixed at predetermined positions to the margin portion 13B of the lattice pallet 13, for example at three positions thereupon. Each of these position determination assistance members 61A, 61B, 61C comprises a base 63 which is fixed by welding or the like to an above described beam 44, 46, or 51, and a position determination pin 65 in an erect attitude which is fixed upon this base 63 so as to be capable of being fitted thereto or removed therefrom (for example, by being coupled by a screw, or by simply being inserted). As shown in FIG. 3 (in which the position determination assistance member 61A is shown as a representative), the position determination pins 65, 65 of these position determination assistance members 61A, 61B, 61C project upwards higher than the upper surfaces of the supporters 52. As will be understood from FIG. 2, the position determination pins 65, 65, 65 are located in positions where their outer circumferential surfaces contact the outer edges of the main portion 13A of the lattice pallet 13. By a long side and a short side of the plate 14 being contacted against the projecting portions of these position determination pins 65, 65, 65, the position of the plate 14 is regulated so that it is in a prescribed attitude and in a prescribed position upon the lattice pallet 13 (in the example shown in FIG. 2, so that the long sides and the short sides of the plate 14 come to be parallel with the long sides and the short sides of the lattice pallet 13, and moreover so that the upper right vertex in the figure of the plate 14 is positionally aligned with the position of the origin upon the lattice pallet 13). It is possible to determine the position of the plate 14 in this manner, even though the size of the plate 14 can vary. When the plate 14 is mounted upon the lattice pallet 13, the position determination assistance members 61A, 61B, and 61C make position determination thereof simple and easy. By removing the position determination pins 65, 65, 65 from the bases 63, 63, 63 before starting cutting the plate 14, the position determination pins 65, 65, 65 are prevented from offering any obstacle to the cutting, and moreover cutting of the position determination pins 65, 65, 65 is prevented. The position determination members 61A, 61B, and 61C are set up in order to prevent the position of the plate 14 deviating during conveyance or the like of the lattice pallet 13. It would also be acceptable to provide more than three of the position determination members 61A, 61B, and 61C. It would also be acceptable to provide four or more position determination members so as to surround the main portion 13A of the lattice pallet 13 (its region upon which the plate 14 is mounted), with the objective of preventing positional slippage of the plate 14. As far as the structure in concrete terms of the position determination members is concerned, other structures than the pins above described may also be employed.

Figure 6:
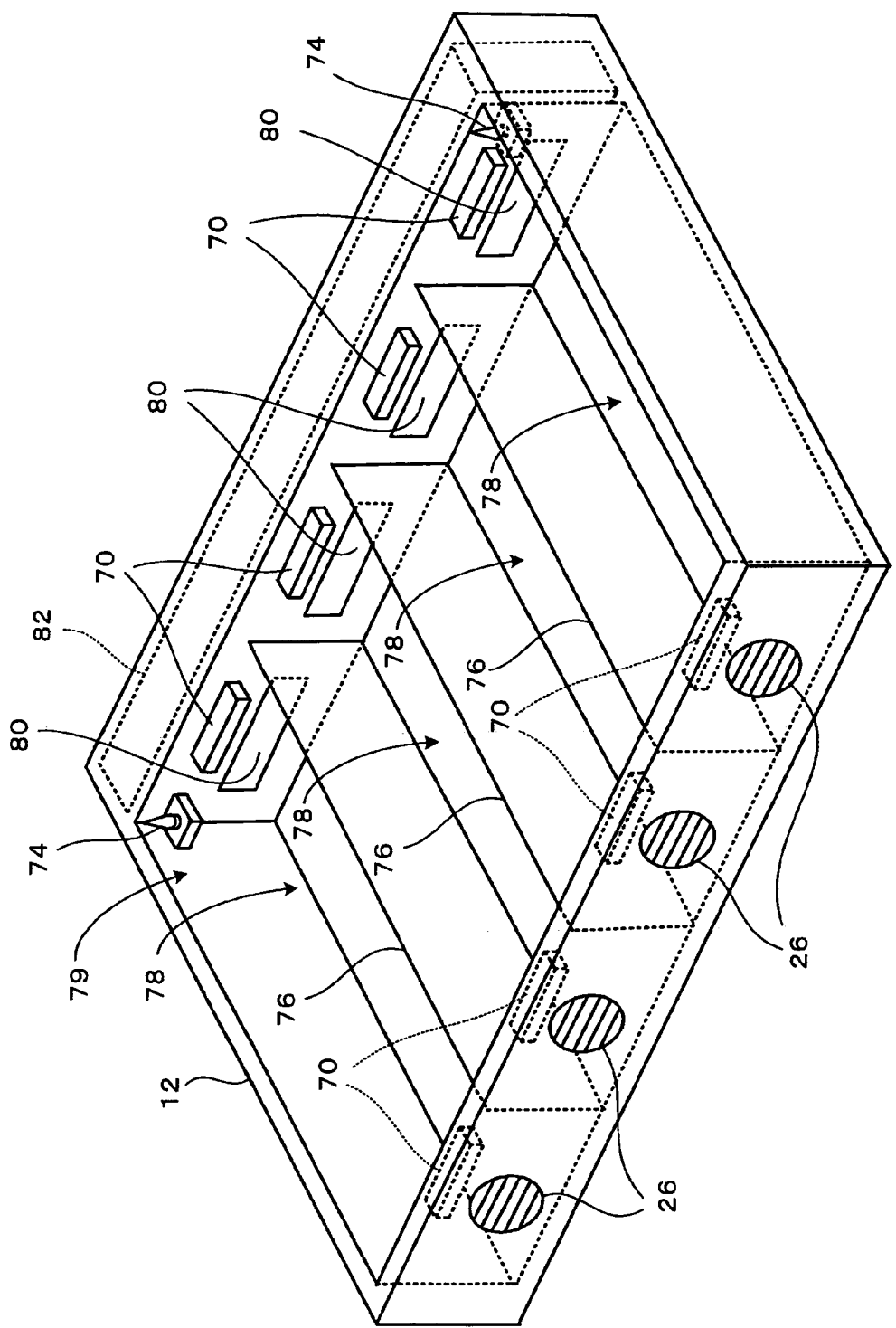
FIG. 6 is a perspective view showing the interior construction of a table 12.

FIG. 6 is a perspective view showing the interior construction of the table 12.

As shown in FIG. 6, in the upper portion of the table 12, there is provided an aperture 79 for the above described lattice pallet 13 to be set into from above. A plurality of support blocks 70, 70, 70, 70, . . . are fixed in low positions at a plurality of spots on the peripheral wall of this aperture 79, for supporting the lattice pallet 13 from underneath when it is set into the aperture 79. Furthermore, guide pins 74 are fitted to the peripheral wall of this aperture 79 in low positions at two of its corner portions, for being inserted into guide holes 62 at the corner portions of the lattice pallet 13 (see FIG. 2). As already explained, when the lattice pallet 13 is lowered with a crane and is set into the aperture 79, these guide pins 74 engage with the guide plate 60 of the lattice pallet 13 and positionally align the lattice pallet 13 into the aperture 79.

In the lower portion of the aperture 79, there are provided a plurality of exhaust chambers 78, 78, 78, 78 for exhausting gas such as fumes or the like which is emitted when cutting the plate 14. These exhaust chambers 78, 78, 78, 78 are separated by partition plates 76, 76, 76. Each of the exhaust chambers 78, 78, 78, 78 extends over a distance range from one side of the lattice pallet to its other side, in the short side direction of the lattice pallet 13 (its Y axis direction). Each of these exhaust chambers 78, 78, 78, 78 has one of the previously described intake fans 26, 26, 26, 26 at its one end, and an exhaust aperture 80, 80, 80, 80 at its other end. Exhaust dampers (not shown in the figure) are provided in each of the exhaust apertures 80, 80, 80, 80. These exhaust apertures 80, 80, 80, 80 lead to the exhaust duct 82 within the table 12. As shown in FIG. 1, the exhaust duct 82 is connected to the intake aperture of the dust collector 30 via the connection duct 28. While cutting of the plate 14 is being performed, corresponding to the position of the cutting head 24, an exhaust aperture 80 is selectively opened to the exhaust chamber 78 in which it is considered that fumes may be present, and exhausting of this exhaust chamber 78 is performed.

According to this thermal cutting machine 10 having the structure described above, the task of bringing in the plate 14 upon the table 12 can be completed by the method of bringing the lattice pallet 13, with the plate 14 placed upon it in advance in some other appropriate location, above the table 12 with a crane and setting it into the aperture 79, in approximately the same amount of time as, in the prior art, bringing in the plate 14 onto the table 12 with a crane. After the cutting has been completed, it is possible to remove the lattice pallet 13 just as it is, carrying the manufactured product and the left over material, by raising it from the table 12 with the crane, and then transferring it to some other appropriate location, in which location it is possible to perform the task of sorting out the manufactured product from the left over material, and eliminating the left over material or the like. Since, during this latter task, it is possible to install a different lattice pallet 13 upon which a different plate 14 is loaded upon the table 12, and to perform cutting of this different plate 14, accordingly the stop time of the thermal cutting machine is much shortened as compared to the prior art, since time is only required for exchanging the lattice pallets 13. Moreover, the exchanging of the supporters 52 of the lattice pallet 13 can also be performed, not upon the table 12, but in a location different from the table 12 as well, so that, during that time, it is possible for the thermal cutting machine 10 to be performing cutting of a different plate 14. A crane for conveyance of the plates 14 and of other resources is an absolutely necessary facility for the workplace in which the thermal cutting machine is set up. Accordingly, when installing the thermal cutting machine 10 of the present invention into an already existing workplace, there is no necessity for special expansion of the workplace with other facilities. Furthermore, it is also unnecessary to provide any special wide area, such as is required for a thermal cutting machine which is equipped with an automatic removal device. Normally, in any workplace, apart from the space in which the thermal cutting machine is set up, spaces are present for performing various types of preparatory tasks and after-cutting tasks, and, if this type of space is taken advantage of as a space for handling lattice pallets 13 which have been separated from the table 12, then it is not necessary to provide any specially broad space in the workplace. Since, as will be understood from the above description, the lattice pallets 13 are of simple structure, the cost of the lattice pallets 13 does not mount so high as to become a problem.

Figure 7:
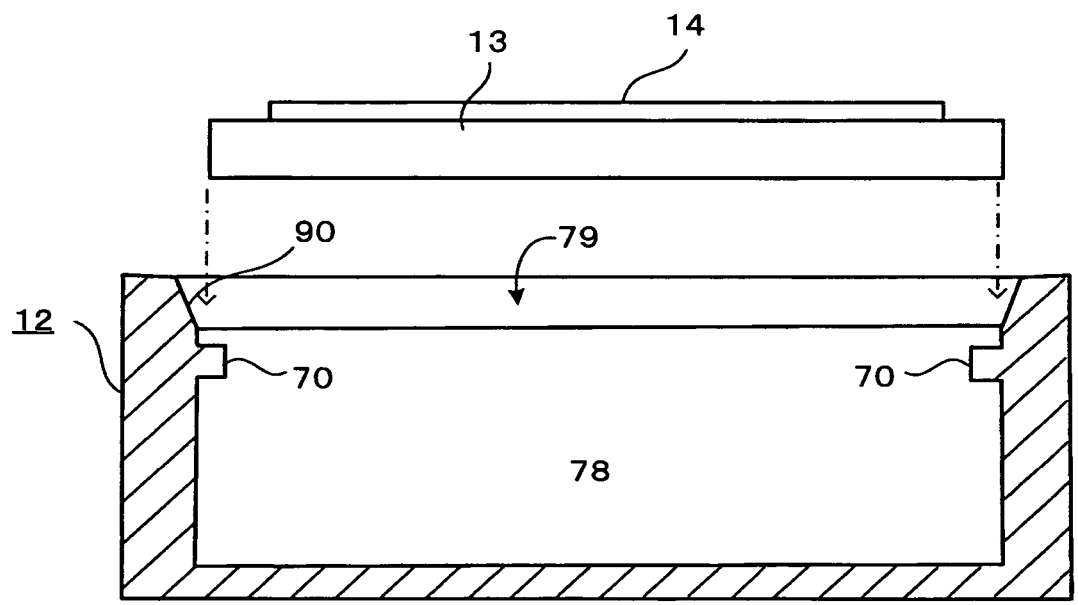
FIG. 7 is a side sectional view showing a variant embodiment of a guide.

FIG. 7 is a side sectional view showing a variant embodiment of the guide for setting the position of the lattice pallet 13 upon the table 12.

As shown in FIG. 7, inclined portions 90 are provided on the peripheral walls of the aperture 79 of the table 12, outwardly expanding upward so as to make the size of this aperture 79 greater than the size of the lattice pallet 13. When lowering the lattice pallet 13 towards the aperture 79 with the crane, if the position of the lattice pallet 13 deviates, the inclined portions 90 of the aperture 79 come into contact with the external frame of the lattice pallet 13, and correct the position of the lattice pallet 13. In this manner, the inclined portions 90 which are provided to the aperture 79 of the table 12 function as guides for positional alignment.

Figure 8:
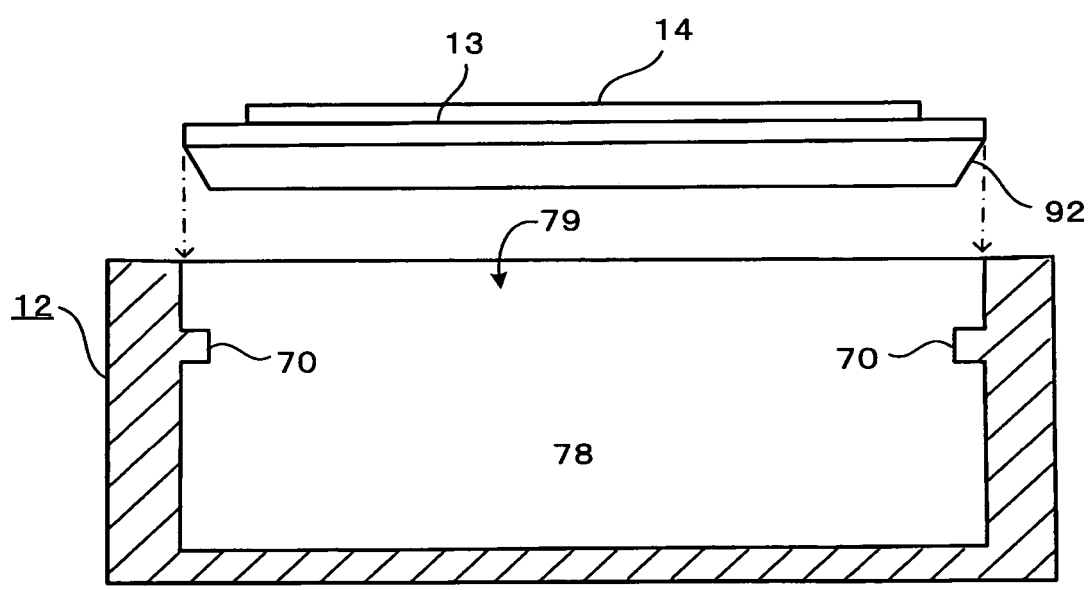
FIG. 8 is a side sectional view showing another variant embodiment of this guide.

FIG. 8 is a side sectional view showing another variant embodiment of this guide for setting the position of the lattice pallet 13 upon the table 12.

As shown in FIG. 8, inclined portions 92 are provided on the external frame of the lattice pallet 13, tapering inwardly downward so as to make its size less than the size of this aperture 79 in the table 12. When lowering the lattice pallet 13 towards the aperture 79 with the crane, if the position of the lattice pallet 13 deviates, the inclined portions 92 of the external frame of the lattice pallet 13 come into contact with the peripheral wall of the aperture 79, and correct the position of the lattice pallet 13. In this manner, the inclined portions 92 which are provided to the external frame of the lattice pallet 13 function as guides for positional alignment.

Although an embodiment of the present invention has been explained above, this embodiment is only for explanation of the present invention; the range of the present invention is not to be considered as being limited only by this embodiment. The present invention may be implemented in various other manners, provided that its gist is not departed from.

The invention claimed is:

1. A thermal cutting machine which cuts a plate placed upon a table using heat, comprising:
   a lattice pallet, which is installed upon said table, and which comprises a plurality of supporters in an array for placing said plate thereupon, and a support frame which supports said plurality of supporters, said support frame of said lattice pallet is installed upon said table so as to be freely removable therefrom, and said lattice pallet can be raised with a crane from said table and separated from said table with said plate still placed just as it is upon said supporters, and moreover can be installed upon said table by being lowered thereupon;
   an exhaust chamber which is provided in an interior of said table;
   an aperture for installing said lattice pallet, provided in an upper portion of said table and connected to said exhaust chamber; and
   guides, provided to one or both of said table and said lattice pallet, for positionally aligning said lattice pallet in said aperture, said guides include at least two guide pins fitted to peripheral walls in at least two corner portions inside said aperture of said table, said guide pins each adapted to insert into respective guide holes provided in respective plate members positioned in at least two corners of the lattice pallet where the plate members are positioned within a margin portion of the lattice pallet; said guides include inclined portions that are provided on peripheral walls of said aperture of said table, in which said inclined portions outwardly expand upward to make a size of said aperture greater than a size of the lattice pallet,
   wherein, when said lattice pallet is lowered down upon said table, said guide pins are inserted into said guide holes of said lattice pallet as said lattice pallet is guided into said aperture by said guides including said inclined portions,
   wherein the margin portion, when one standard dimension plate of a predetermined type is mounted in the middle of the lattice pallet, projects to an outside of said standard dimension plate, and a plurality of engagement lugs disposed inside said margin portion for engaging with hooks of raising wires,
   wherein the margin portion is defined between the outside of the standard dimension plate mounted in the middle of the lattice pallet and an inside of an external support frame of the lattice pallet.

2. The thermal cutting machine described in claim 1, wherein said supporters of said lattice pallet are freely fittable and removable to and from said support frame, and are adapted so that, after said lattice pallet has been transferred to a different location from said table, said supporters upon said support frame can be exchanged.

3. The thermal cutting machine described in claim 1, wherein said lattice pallet comprises position determination assistance members for aiding with position determination of said plate placed upon said lattice pallet.

4. The thermal cutting machine described in claim 1, characterized by comprising a plurality of lattice pallets which can be installed upon said table one after another.

5. The thermal cutting machine as set forth described in claim 1, wherein:
   said guides further comprising inclined portions provided on an external frame of said lattice pallet, in which said inclined portions taper inwardly downward to make a size of said inclined portions less than the size of said aperture in said table.

6. The thermal cutting machine described in claim 1, the form of each of the guide pins is cone and the form of each of the guide holes is circular.

* * * * *